US012089000B2

(12) United States Patent
Katsumi

(10) Patent No.: US 12,089,000 B2
(45) Date of Patent: Sep. 10, 2024

(54) SIGNAL PROCESSING APPARATUS, SIGNAL PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Daisuke Katsumi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 182 days.

(21) Appl. No.: 17/951,260

(22) Filed: Sep. 23, 2022

(65) Prior Publication Data

US 2023/0105382 A1 Apr. 6, 2023

(51) Int. Cl.
*H04R 1/00* (2006.01)
*H04R 1/40* (2006.01)
*H04R 3/00* (2006.01)

(52) U.S. Cl.
CPC ............. *H04R 1/406* (2013.01); *H04R 3/005* (2013.01)

(58) Field of Classification Search
CPC ................................ H04R 1/406; H04R 3/005
See application file for complete search history.

(56) References Cited

U.S. PATENT DOCUMENTS

2016/0148057 A1* 5/2016 Oh ...................... G06V 10/803 348/143
2023/0045536 A1* 2/2023 Kee ....................... H04R 3/005

FOREIGN PATENT DOCUMENTS

JP H08-286680 A 11/1996
JP 2019-050593 A 3/2019
JP 2021-012314 A 2/2021
WO 2020/059447 A1 3/2020

OTHER PUBLICATIONS

Notice of Reasons for Refusal issued by the Japanese Patent Office on May 31, 2024 in corresponding JP Patent Application No. 2021-163073, with English translation.

* cited by examiner

*Primary Examiner* — Rasha S Al Aubaidi
(74) *Attorney, Agent, or Firm* — Carter, DeLuca & Farrell LLP

(57) ABSTRACT

A signal processing apparatus comprises one or more processors, and a memory storing executable instructions which, when executed by the one or more processors, cause the image processing apparatus to function as a selection unit configured to select, as selected sound acquisition units, two or more sound acquisition units from a plurality of sound acquisition units, based upon a position of a target estimated based upon a plurality of captured images including the target, a combining unit configured to combine delayed acoustic signals obtained by delaying acoustic signals from each of the selected sound acquisition units, based upon a delay amount based upon a distance between the selected sound acquisition unit and the target, and an output unit configured to output, as an acoustic signal of the target, a combination result combined by the combination unit.

9 Claims, 5 Drawing Sheets

SIGNAL PROCESSING APPARATUS, SIGNAL PROCESSING METHOD, AND NON-TRANSITORY COMPUTER-READABLE STORAGE MEDIUM

BACKGROUND OF THE INVENTION

Field of the Invention

The present invention pertains to signal processing technology.

Description of the Related Art

Conventionally, there is a virtual viewpoint video generation system that can create, from images captured by an image capturing system using a plurality of cameras, an image as viewed from a virtual viewpoint specified by a user, and that can reproduce the image as virtual viewpoint video. For instance, in an invention of Japanese Patent Laid-Open No. 2019-050593, images captured by a plurality of cameras are transmitted, and then, an image computing server (image processing apparatus) extracts, as a foreground image, an image having a large change, and extracts, as background image, an image having a small change, from the captured images. Based upon the foreground image extracted, a shape of a three-dimensional model of a subject is estimated/generated, and is stored in a storage apparatus, together with the foreground image and the background image. Then, appropriate data is acquired from the storage apparatus, based upon a virtual viewpoint specified by a user, and virtual viewpoint video can be generated.

On the other hand, in image capturing of a television program and a movie, a sound acquisition operator directs, toward a target, a shotgun microphone having high directivity, while avoiding reflection of the sound acquisition operator and the shotgun microphone on a camera, and thus, sound acquisition of a sound wave emitted from a target having movement is accomplished. According to an invention of Japanese Patent Laid-Open No. 2021-012314, sound acquisition directivity is controlled based upon a position and a feature of a sound acquisition target detected based upon an image, and thus, an acoustic signal can be obtained precisely.

In the virtual viewpoint video generation system described above, a sound acquisition operator and a shotgun microphone become unnecessary foreground images in virtual viewpoint video generation, but since the cameras are arranged to surround a target, it is difficult to avoid reflection of the sound acquisition operator and the shotgun microphone on the cameras.

In the technique of Japanese Patent Laid-Open No. 2021-012314, a sound acquisition operator operating a shotgun microphone is not present, but since only an azimuth angle of a sound acquisition target is estimated and the directivity control is performed, it is difficult to control directivity based upon a three-dimensional position of a target including a depth and a height.

SUMMARY OF THE INVENTION

According to the first aspect of the present invention, there is provided a signal processing apparatus comprising: one or more processors; and a memory storing executable instructions which, when executed by the one or more processors, cause the image processing apparatus to function as: a selection unit configured to select, as selected sound acquisition units, two or more sound acquisition units from a plurality of sound acquisition units, based upon a position of a target estimated based upon a plurality of captured images including the target; a combining unit configured to combine delayed acoustic signals obtained by delaying acoustic signals from each of the selected sound acquisition units, based upon a delay amount based upon a distance between the selected sound acquisition unit and the target; and an output unit configured to output, as an acoustic signal of the target, a combination result combined by the combination unit.

According to the second aspect of the present invention, there is provided a signal processing method comprising: selecting, as selected sound acquisition units, two or more sound acquisition units from a plurality of sound acquisition units, based upon a position of a target estimated based upon a plurality of captured images including the target; combining delayed acoustic signals obtained by delaying acoustic signals from each of the selected sound acquisition units, based upon a delay amount based upon a distance between the selected sound acquisition unit and the target; and outputting, as an acoustic signal of the target, a combination result combined in the combining.

According to the third aspect of the present invention, there is provided a non-transitory computer-readable storage medium storing a computer program for causing a computer to function as: a selection unit configured to select, as selected sound acquisition units, two or more sound acquisition units from a plurality of sound acquisition units, based upon a position of a target estimated based upon a plurality of captured images including the target; a combining unit configured to combine delayed acoustic signals obtained by delaying acoustic signals from each of the selected sound acquisition units, based upon a delay amount based upon a distance between the selected sound acquisition unit and the target; and an output unit configured to output, as an acoustic signal of the target, a combination result combined by the combination unit.

Further features of the present invention will become apparent from the following description of exemplary embodiments with reference to the attached drawings.

DESCRIPTION OF THE EMBODIMENTS

Figure 1:
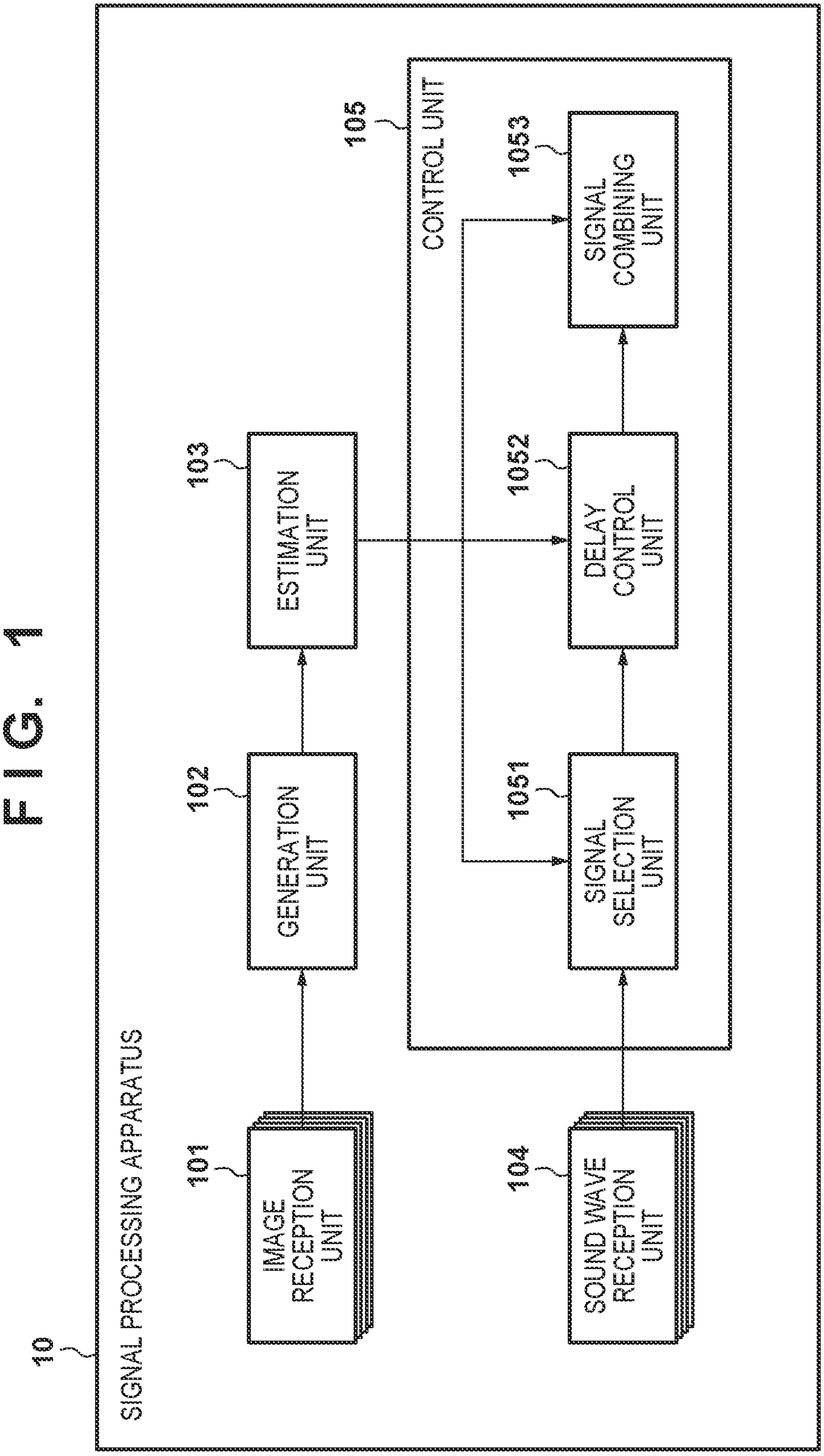
FIG. 1 is a block diagram illustrating a functional configuration example of a signal processing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

A signal processing apparatus related to the present embodiment selects, as selected sound acquisition units, two or more sound acquisition units from a plurality of sound acquisition units, based upon a position of a target estimated based upon a plurality of captured images including the target. Then, the signal processing apparatus acquires a delayed acoustic signal obtained by delaying an acoustic signal from each of the selected sound acquisition unit, based upon a delay amount based upon a distance between the selected sound acquisition unit and the target, and outputs, as an acoustic signal of the target, a combination result obtained by combining delayed acoustic signals acquired for the respective selected sound acquisition units. First, a functional configuration example of such a signal processing apparatus will be explained with reference to a block diagram of FIG. 1.

A signal processing apparatus 10 of FIG. 1 has a plurality of image reception units 101, and in the present embodiment, the plurality of image reception units 101 are installed around an image sensing target region (for instance, the range in which a target that becomes a sound acquisition target is movable) and are directed toward the image sensing target region. That is, the plurality of image reception units 101 are configured to be able to capture images of an inside of the image sensing target region.

A generation unit 102 generates a three-dimensional model of a target by using a plurality of captured images including the target, among the captured images output from the plurality of image reception units 101. Various methods are applicable as a method of generating a three-dimensional model of a target from a plurality of captured images including the target, and the present embodiment is not limited to use of a particular method. In the present embodiment, for instance, a method explained below may be adopted as the method of generating a three-dimensional model of a target from a plurality of captured images in which the target appears.

First, foreground/background separation is performed for each of captured images, and a foreground is extracted from each of the captured images. Here, a background difference method is used as a method of foreground/background separation. An image (background image) that becomes a background in a state where there is no subject that becomes a foreground is captured and acquired in advance, and the background image and the captured image output from the image reception unit 101 are compared, and thus, a pixel having a large difference from the background image in the captured image is specified as a pixel of the foreground.

Subsequently, a three-dimensional model is generated by a visual hull method by using each of the captured images in which the foreground is specified. The visual hull method includes dividing a target region of generating a three-dimensional model into fine rectangular parallelepipeds (hereinafter, referred to as voxels), calculating, by three-dimensional calculation, a pixel in a case where each of cubes appears in a plurality of captured images, and determining whether the voxel corresponds to the pixel of the foreground. In a case where the voxel corresponds to the pixel of the foreground of all of the image reception units 101, the voxel is specified as a voxel constituting a target in the target region. In this way, only the voxel specified as the foreground in all of the image reception units 101 remains, and other voxels are deleted. The voxel having finally remained is a voxel constituting a target that is present in the target region, and a three-dimensional model of the target is generated.

An estimation unit 103 estimates a centroid position (three-dimensional position) of the three-dimensional model of the target generated by the generation unit 102, as a "position (three-dimensional position) of the target in the image sensing target region." Note that in a case where two or more targets are in the image sensing target region, each of the targets is identified. There are various methods as a method of identifying a target, and, for instance, each of targets may be identified based upon feature amounts such as size, a shape, and color of the target on a captured image or a three-dimensional model of the target.

Note that the "position (three-dimensional position) of the target in the image sensing target region" is not limited to the centroid position (three-dimensional position) of the three-dimensional model of the target generated by the generation unit 102, and may be any position in the three-dimensional model.

In addition, the signal processing apparatus 10 includes a plurality of sound wave reception units 104, and in the present embodiment, the plurality of sound wave reception units 104 are installed around the image sensing target region, and are directed toward the image sensing target region. That is, the plurality of sound wave reception units 104 are each configured to be able to acquire a sound wave from the target in the image sensing target region. Each of the plurality of sound wave reception units 104 outputs, as an acoustic signal, the sound wave acquired.

A control unit 105 selects, as selected sound wave reception units, two or more sound wave reception units 104 from the plurality of sound wave reception units 104, based upon the position of the target estimated by the estimation unit 103. Then, the control unit 105 acquires a delayed acoustic signal obtained by delaying an acoustic signal from each of the selected sound wave reception units, based upon a delay amount based upon a distance between a position of the selected sound wave reception unit and the position of the target. Then, the control unit 105 outputs, as an acoustic signal of the target, a combination result obtained by combining delayed acoustic signals acquired for the respective selected sound wave reception units.

A signal selection unit 1051 selects, as selected sound wave reception units, two or more sound wave reception units 104 in order from the sound wave reception units 104 closer to the position of the target estimated by the estimation unit 103, among the plurality of sound wave reception units 104. A criteria of this selection is due to the fact that as the sound wave reception unit 104 is closer to a target, a clearer acoustic signal can be obtained from the target.

A delay control unit 1052 determines, for each of the selected sound wave reception units, a delay amount, based upon a distance between a position of the selected sound wave reception unit and the position of the target. Then, the delay control unit 1052 acquires, for each of the selected sound wave reception units, a delayed acoustic signal obtained by delaying an acoustic signal from the selected sound wave reception unit by the delay amount determined for the selected sound wave reception unit.

A signal combining unit 1053 acquires, for each of the selected sound wave reception units, an amplified acoustic signal obtained by amplifying, based upon a distance between a position of the selected sound wave reception unit and the position of the target, a delayed acoustic signal acquired for the selected sound wave reception unit. Then, the signal combining unit 1053 outputs, as an acoustic signal of the target, a combination result obtained by combining amplified acoustic signals acquired for the respective selected sound wave reception units.

Note that in a case where there are a plurality of targets, the generation unit 102, the estimation unit 103, and the control unit 105 operate as described above for each of the targets, and as a consequence, an acoustic signal of each of the targets is generated and output.

Figure 2:
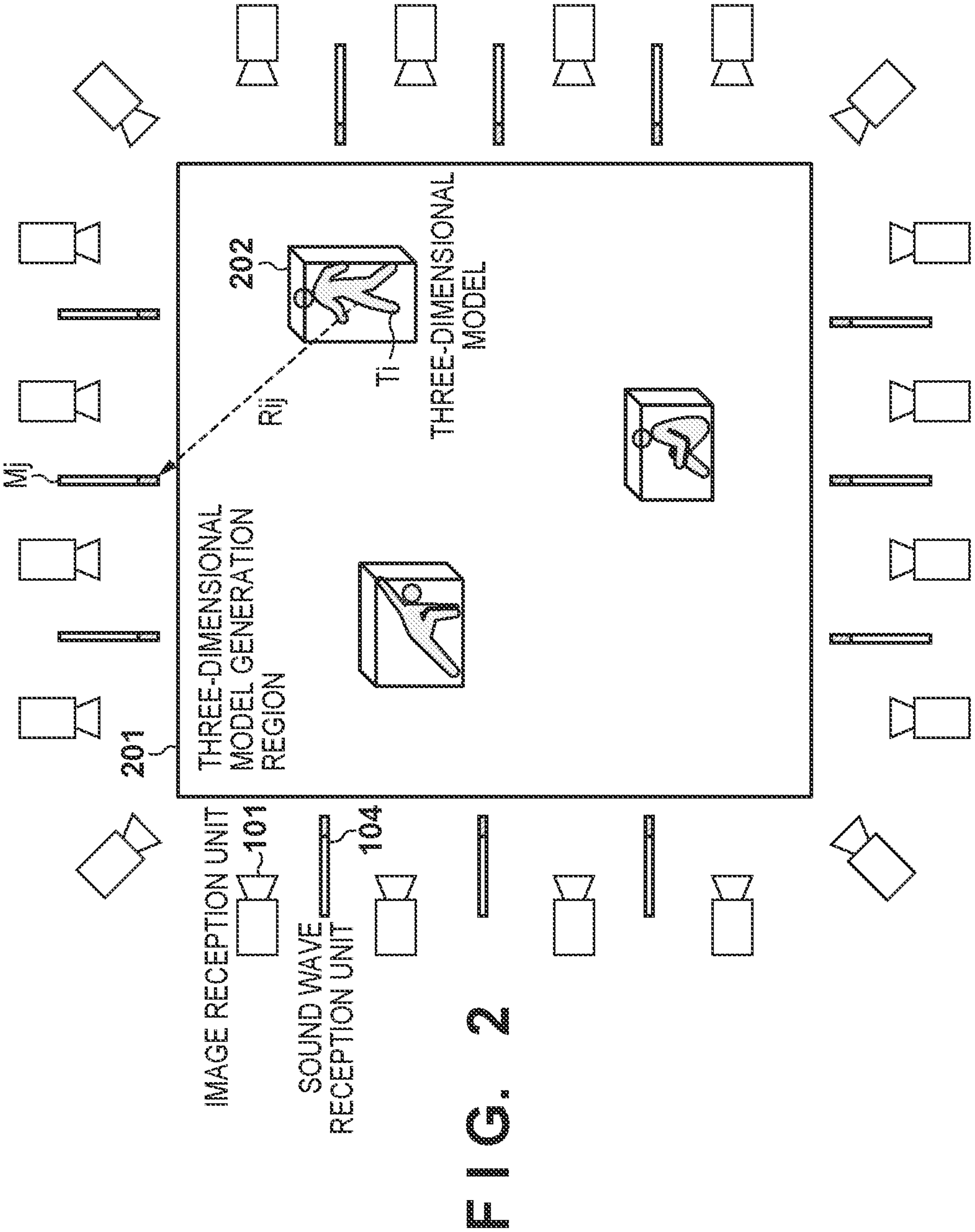
FIG. 2 is a figure illustrating an arrangement example of an image reception unit 101 and a sound wave reception unit 104.

Subsequently, an arrangement example of the image reception units 101 and the sound wave reception units 104 will be explained with reference to FIG. 2. As illustrated in FIG. 2, the plurality of image reception units 101 and the plurality of sound wave reception units 104 are arranged to surround a three-dimensional model generation region 301 that is a target region of generating a three-dimensional model (that is, the image sensing target region). The plurality of image reception units 101 are each arranged to direct an image capturing direction toward an inside of the three-dimensional model generation region 301. The plurality of sound wave reception units 104 are each arranged to direct a sound acquisition direction toward the inside of the three-dimensional model generation region 301.

In FIG. 2, in the inside of the three-dimensional model generation region 301, three persons that become targets of sound acquisition are present. An i-th target Ti among the three targets is, for instance, a performer in a play or the like, and speaks the performer's lines while moving in the inside of the three-dimensional model generation region 301. A three-dimensional model 202 is a three-dimensional model generated by the generation unit 102 for the target Ti.

Figure 3:
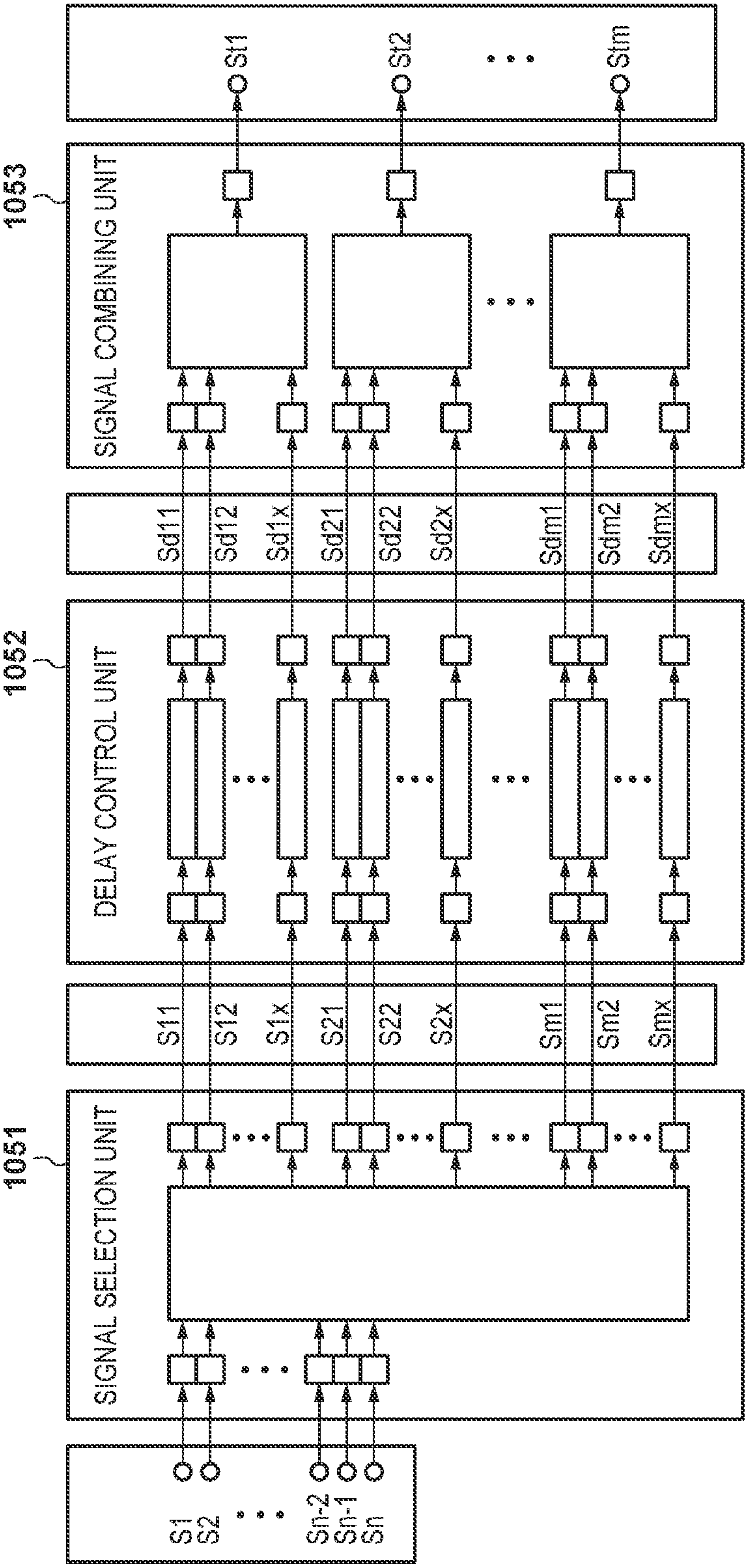
FIG. 3 illustrates a configuration example of a control unit 105.

Subsequently, a configuration example of the control unit 105 described above will be explained with reference to FIG. 3. In FIG. 3, n represents the number of the sound wave reception units 104, x represents the number of the selected sound wave reception units selected by the signal selection unit 1051 for one target, and m represents the number of targets.

Acoustic signals S1 to Sn output from the n sound wave reception units 104 are input to the signal selection unit 1051. Sj(1≤j≤n) represents an acoustic signal from a j-th sound wave reception unit 104 among the n sound wave reception units 104. Then, the signal selection unit 1051 selects, as selected sound wave reception units, x sound wave reception units 104, for each of targets, in order from the sound wave reception units 104 closer to a position of the target. S11, S12, . . . , S1*x* represent acoustic signals from the x sound wave reception units 104 selected in order from the sound wave reception units 104 closer to a position of a first target. S21, S22, . . . , S2*x* represent acoustic signals from the x sound wave reception units 104 selected in order from the sound wave reception units 104 closer to a position of a second target. Sm1, Sm2, . . . , Smx represent acoustic signals from the x sound wave reception units 104 selected in order from the sound wave reception units 104 closer to a position of an m-th target.

The delay control unit 1052 performs processing subsequently described for each of the targets, and thus, acquires a delayed acoustic signal corresponding to the target. The case where the delay control unit 1052 acquires a delayed acoustic signal corresponding to the target Ti will be explained below.

First, the delay control unit 1052 determines, for each of selected sound wave reception units selected for the target Ti, a delay amount with respect to an acoustic signal from the selected sound wave reception unit, based upon a distance between a position of the selected sound wave reception unit and a position of the target Ti. For instance, a distance set in advance as an ideal distance of the sound wave reception unit 104 with respect to a target is defined as Rref, speed of sound is defined as α, and a distance between a position of a j-th selected sound wave reception unit Mj among the selected sound wave reception units selected for the target Ti and the position of the target Ti is defined as Rij. On this occasion, the delay control unit 1052 determines a delay amount Dij with respect to an acoustic signal Sij of the selected sound wave reception unit Mj, in accordance with (Equation 1) described below:

$$Dij=|Rij-Rref|/\alpha \qquad \text{(Equation 1).}$$

Nate that the equation for determining the delay amount Dij is not limited to (Equation 1), and as long as an equation includes calculation of dividing a difference between Rij and Rref by α, the equation for determining the delay amount Dij is not limited to a particular equation.

Then, the delay control unit 1052 acquires, for each of the selected sound wave reception units selected for the target Ti, a delayed acoustic signal obtained by delaying an acoustic signal from the selected sound wave reception unit by the delay amount determined for the selected sound wave reception unit. For instance, the delay control unit 1052 acquires a delayed acoustic signal Sdij(t) of an acoustic signal Sij(t) obtained at time t, in accordance with (Equation 2) described below:

$$Sdij(t)=Sij(t-Dij) \qquad \text{(Equation 2).}$$

That is, the delay control unit 1052 shills the acoustic signal Sij(t) in a time direction to cancel the delay amount Dij, and thus, obtains the delayed acoustic signal Sdij(t) delayed by a delay amount equivalent to that in a case where sound acquisition is performed close by the target Ti. For instance, in image capturing of a television program and a movie, Rref may be a distance between a target and a microphone that a sound acquisition operator directs toward the target while avoiding reflection of the sound acquisition operator and the microphone on a camera.

In FIG. 3, Sd11, Sd12, . . . , Sd1*x* are delayed acoustic signals of S11, S12, . . . , S1*x*, respectively, and are delayed acoustic signals corresponding to the first target. Sd21, Sd22, . . . , Sd2*x* are delayed acoustic signals of S21, S22, . . . , S2*x*, respectively, and are delayed acoustic signals corresponding to the second target. In addition, Sdm1, Sdm2, . . . , Sdmx are delayed acoustic signals of Sm1, Sm2, . . . , Smx, respectively, and are delayed acoustic signals corresponding to the m-th target.

The signal combining unit 1053 performs processing described below fix each of targets, and thus, generates and outputs an acoustic signal of the target. The case where the signal combining unit 1053 generates and outputs an acoustic signal of the target Ti will be explained below.

First, the signal combining unit 1053 determines, for each of selected sound wave reception units selected for the target Ti, an amplification coefficient of a delayed acoustic signal acquired for the selected sound wave reception unit. For instance, the signal combining unit 1053 determines an amplification coefficient Gjx of a delayed acoustic signal Sdij acquired for the j-th selected sound wave reception unit Mj among the selected sound wave reception units selected for the target Ti, in accordance with (Equation 3) described below:

$$Gjx=20 \log 10(Rij/Rgref) \qquad \text{(Equation 3)}$$

wherein, log 10( ) is a common logarithm, and Rgref represents a distance set in advance as an ideal distance of the sound wave reception unit 104 with respect to a target. In addition, here, emitted sound of a target is assumed to be a point sound source.

Then, the signal combining unit 1053 acquires, for each of the selected sound wave reception units selected for the target Ti, an amplified acoustic signal obtained by amplifying, in accordance with the amplification coefficient determined for the selected sound wave reception unit, a delayed acoustic signal acquired for the selected sound wave reception unit. Then, the signal combining unit 1053 outputs, as an acoustic signal of the target Ti, a combination result obtained by combining amplified acoustic signals acquired for the respective selected sound wave reception units selected for the target Ti. For instance, the signal combining unit 1053 generates an acoustic signal Sti(t) of the target Ti obtained at the time t, in accordance with (Equation 4) described below:

$$Sti(t)=\Sigma(Sdij(t)\times Gjx)/x \quad \text{(Equation 4)}$$

wherein Σ represents calculation of a total sum for j=1 to x. Generally, an attenuation amount of a sound wave with respect to a point sound source as a distance doubles is approximately 6 dB. Thus, the delayed acoustic signal Sdij is amplified by the amplification coefficient Gjx determined by (Equation 3) described above, and a combination result obtained by combining delayed acoustic signals having amplified is defined as an acoustic signal of the target Ti. St1 is an acoustic signal of the first target, St2 is an acoustic signal of the second target, and Stm is an acoustic signal of the m-th target.

The above-described operation of the control unit 105 may be performed each time the image reception unit 101 captures an image (that is, for each frame), or may not be in synchronization with image capturing timing by the image reception unit 101.

Figure 4:
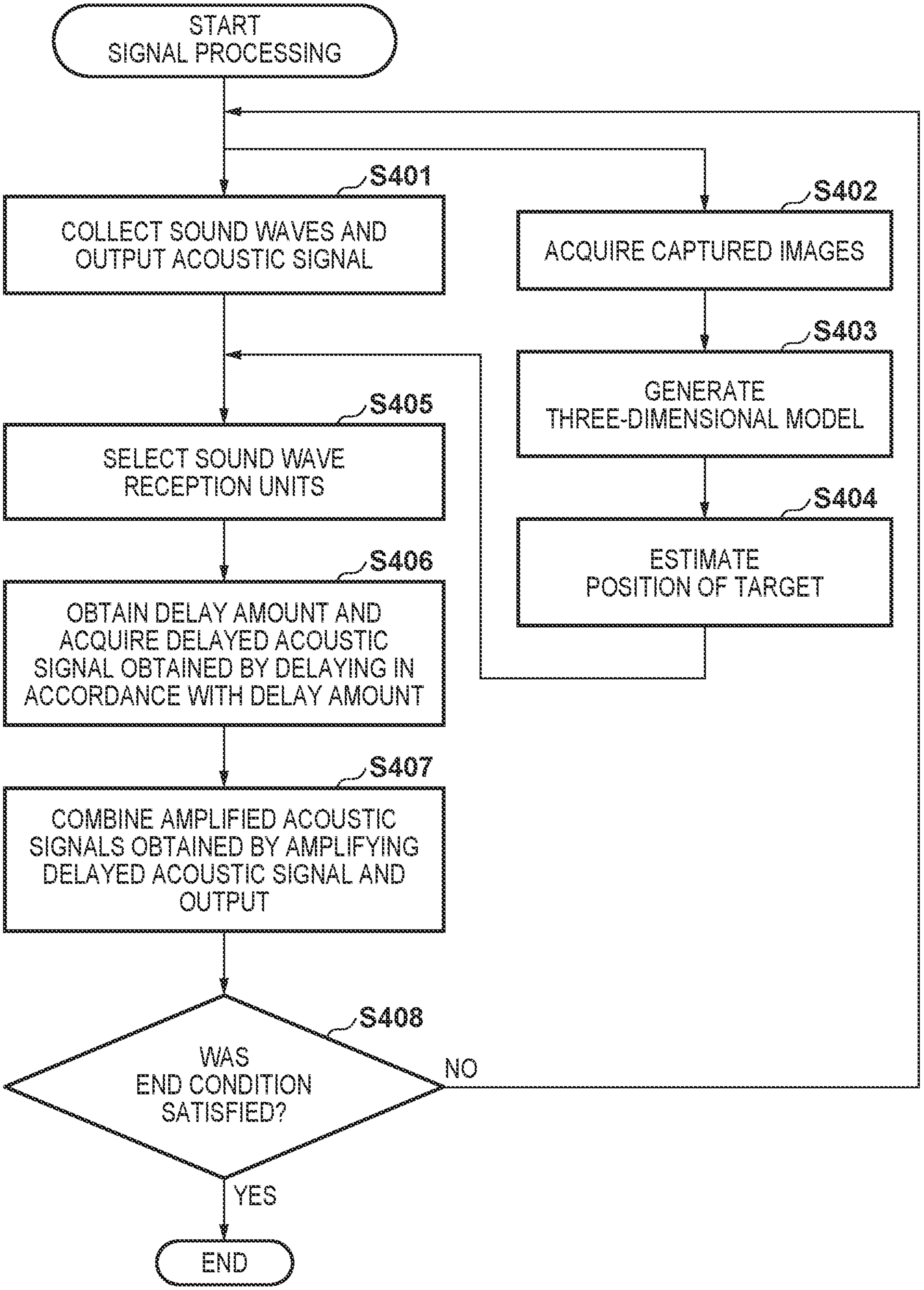
FIG. 4 is a flowchart of processing performed by a signal processing apparatus 10 to generate and output an acoustic signal of a target.

Subsequently, processing performed by the signal processing apparatus 10 to generate and output an acoustic signal of a target will be explained with reference to a flowchart of FIG. 4, A detail of processing at each step of FIG. 4 is as described above, and thus, the processing will be explained simply.

At step S401, the plurality of sound wave reception units 104 acquire (receive) a sound wave from a target being in an image sensing target region, and outputs, as an acoustic signal, the sound wave acquired. Processing at steps S402 to S404 is performed in parallel with that at step S401.

At step S402, the plurality of image reception units 101 capture images of an inside of the image sensing target region, and thus, acquire captured images of the inside of the image sensing target region. At step S403, the generation unit 102 generates a three-dimensional model of a target by using a plurality of captured images including the target, among the captured images output from the plurality of image reception units 101.

At step S404, the estimation unit 103 estimates a centroid position (three-dimensional position) of the three-dimensional model of the target generated by the generation unit 102, as a "position (three-dimensional position) of the target in the image sensing target region."

At step S405, the signal selection unit 1051 selects, as selected sound wave reception units, two or more sound wave reception units 104 in order from the sound wave reception units 104 closer to the position of the target estimated by the estimation unit 103 among the plurality of sound wave reception units 104.

At step S406, the delay control unit 1052 determines, for each of the selected sound wave reception units, a delay amount, based upon a distance between a position of the selected sound wave reception unit and the position of the target. Then, the delay control unit 1052 acquires, for each of the selected sound wave reception units, a delayed acoustic signal obtained by delaying an acoustic signal from the selected sound wave reception unit by the delay amount determined for the selected sound wave reception unit.

At step S407, the signal combining unit 1053 acquires, for each of the selected sound wave reception units, an amplified acoustic signal obtained by amplifying, based upon the distance between the position of the selected sound wave reception unit and the position of the target, a delayed acoustic signal acquired for the selected sound wave reception unit. Then, the signal combining unit 1053 outputs, as an acoustic signal of the target, a combination result obtained by combining amplified acoustic signals acquired for the respective selected sound wave reception units.

In a case where there are a plurality of targets, the processing at steps S403 to S407 is performed for each of the targets and as a consequence, an acoustic signal is generated and output for each of the targets. Then, in a case where an end condition of the processing according to the flowchart of FIG. 4 is satisfied, the processing according to the flowchart of FIG. 4 ends, and in a case where the end condition is not satisfied, the processing returns to step S401. The end condition of the processing is not limited to a particular end condition, and examples of the end condition include "input of an end instruction of the processing in response to a user operation," "elapse of certain time after a start of the processing according to the flowchart, of FIG. 4," and "current time having become prescribed time."

In this way, by virtue of the present embodiment, an acoustic signal of a target can be acquired with high sound quality, while avoiding an unnecessary foreground in free-viewpoint video generation. This also applies to the case where there are a plurality of targets.

MODIFICATION EXAMPLE

A sound wave reception unit 104 may be combined with an electric panhead that can control an azimuth angle and an elevation angle. In this case, a signal processing apparatus 10 may control the electric panhead to control an azimuth angle and an elevation angle of the sound wave reception unit 104 to direct the sound wave reception unit 104 in a direction of a target.

Second Embodiment

In FIG. 1, the signal processing apparatus 10 is constituted by including the image reception unit 101 and the sound wave reception unit 104, but the image reception unit 101 and the sound wave reception unit 104 may be external apparatuses of the signal processing apparatus 10. That is, the signal processing apparatus 10 may have the generation unit 102, the estimation unit 103, and the control unit 105 (the signal selection unit 1051, the delay control unit 1052, and the signal combining unit 1053), and the image reception unit 101 and the sound wave reception unit 104 may be configured to be connected to the signal processing apparatus 10 via an interface not illustrated. In this case, the generation unit 102, the estimation unit 103, and the control unit 105 (the signal selection unit 1051, the delay control unit 1052, the signal combining unit 1053) may be implemented by hardware, or may be implemented by software (computer program). In the latter case, a computer apparatus that can execute such a computer program is applicable to the signal processing apparatus 10. A hardware configuration example of the computer apparatus applicable to the signal processing apparatus 10 will be explained with reference to a block diagram of FIG. 5.

A CPU 501 executes various types of processing by using a computer program and data stored in a RAM 502 or a ROM 503. Accordingly, the CPU 501 controls an operation of the computer apparatus entirely, and also executes or controls each type of processing described above as the processing to be performed by the signal processing apparatus 10.

The RAM 502 has a region for storing a computer program and data loaded from the ROM 503 or an external storage unit 504, and a region for storing data externally received via an I/F 507. Further, the RAM 502 has a work area used when the CPU 501 executes various types of processing. In this way, the RAM 502 can provide various types of regions as appropriate.

In the ROM 503, setting data of the computer apparatus, a computer program and data related to activation of the computer apparatus, a computer program and data related to a basic operation of the computer apparatus, and the like are stored.

The external storage unit 504 is a large-capacity information storage device such as a hard disk drive device. In the external storage unit 504, an operating system (OS), and a computer program, data and the like for causing the CPU 501 to execute or control each types of processing described above as the processing to be performed by the signal processing apparatus 10 are saved. The data saved in the external storage unit 504 includes information handled as known information in the above-described explanation, such as, for instance, three-dimensional positions of the plurality of sound wave reception units 104, information explained as the information set in advance, and the like.

The computer program and data saved in the external storage unit 504 are loaded to the RAM 502 as appropriate in accordance with control executed by the CPU 501, and are subjected to processing to be executed by the CPU 501.

An output unit 505 is a display apparatus that displays a processing result executed by the CPU 501, with an image a character and the like, and has a liquid crystal screen and a touch panel screen. Note that the output unit 505 may be a projection apparatus such as a projector that projects an image and a character. In addition, the output unit 505 may be a speaker apparatus that can output sound based upon an acoustic signal of a target. In addition, the output unit 505 may be an apparatus including a combination of part or all of these apparatuses.

An operation unit 506 is a user interface such as a keyboard, a mouse, and a touch panel screen, and can input various types of instructions to the CPU 501 by a user operation.

The I/F 507 is a communication interface for performing data communication with an external apparatus. For instance, in a case where the image reception unit 101 and the sound wave reception unit 104 are connected to the present computer apparatus via the I/F 507, the present computer apparatus receives a captured image from the image reception unit 101 via the I/F 507 and receives an acoustic signal from the sound wave reception unit 104 via the I/F 507. In addition, an apparatus that can output sound such as a speaker may be connected to the I/F 507, and for instance, sound based upon an acoustic signal of a target may be output to the apparatus.

Figure 5:
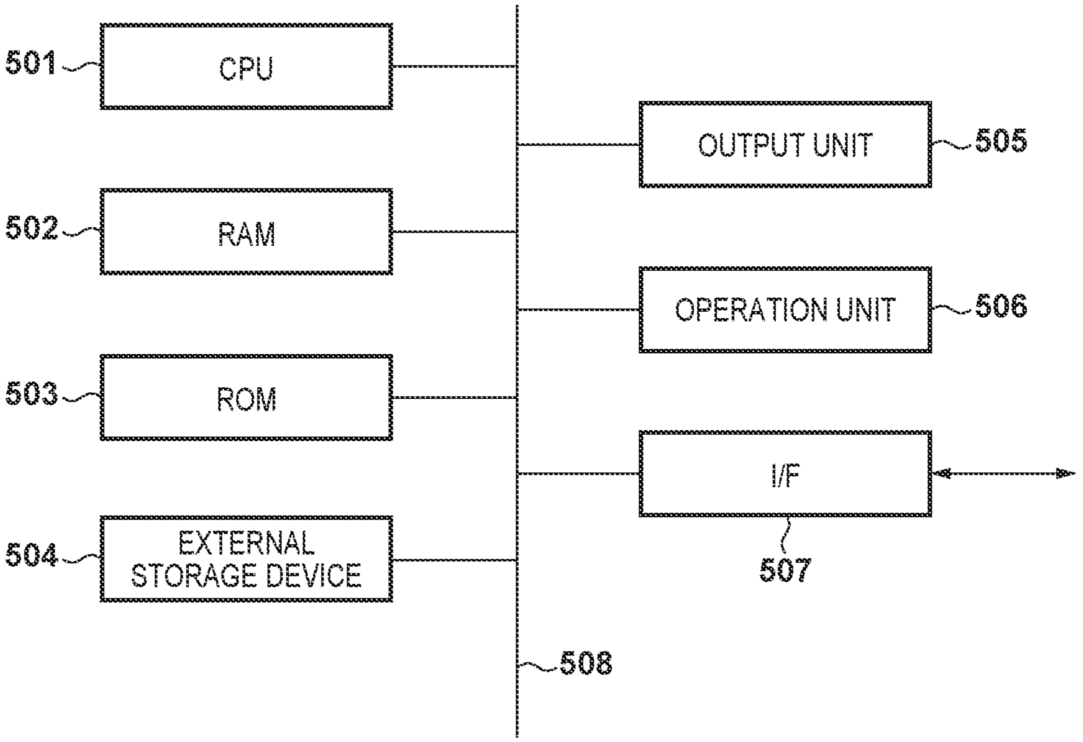
FIG. 5 is a block diagram illustrating a hardware configuration example of a computer apparatus applicable to the signal processing apparatus 10.

Any of the CPU 501, the RAM 502, the ROM 503, the external storage unit 504, the output unit 505, the operation unit 506, and the I/F 507 is connected to a system bus 508. Note that the configuration illustrated in FIG. 5 is merely an example of a configuration applicable to the signal processing apparatus 10, and may be changed modified as appropriate.

In addition, a numerical value, processing timing, order of processing, a processing target, a transmission destination/transmission source/storage location of data (information) or the like which are used in each of the embodiments and the modification example described above are given as an example to make specific explanation, and are not intended to be limited to such an example.

In addition, part or all of each of the embodiments and the modification example explained above may be used in combination as appropriate. In addition, part or all of each of the embodiments and the modification example explained above may be used selectively.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-163073, filed Oct. 1, 2021, which is hereby incorporated by reference herein in its entirety.

What is claimed is:

1. A signal processing apparatus comprising:

one or more processors; and a memory storing executable instructions which, when executed by the one or more processors, cause the image processing apparatus to function as:

a selection unit configured to select, as selected sound acquisition units, two or more sound acquisition units from a plurality of sound acquisition units, based upon a position of a target estimated based upon a plurality of captured images including the target;

a combining unit configured to combine delayed acoustic signals obtained by delaying acoustic signals from each of the selected sound acquisition units, based upon a delay amount based upon a distance between the selected sound acquisition unit and the target; and an output unit configured to output, as an acoustic signal of the target, a combination result combined by the combination unit.

2. The signal processing apparatus according to claim 1, wherein the selection unit selects, as selected sound acquisition units, two or more sound acquisition units from the plurality of sound acquisition units, based upon a position of the target estimated based upon a three-dimensional model of the target generated based upon the plurality of captured images.

3. The signal processing apparatus according to claim 2, wherein the selection unit selects, as selected sound acquisition units, two or more sound acquisition units in order from the sound acquisition units closer to the position among the plurality of sound acquisition units.

4. The signal processing apparatus according to claim 1, wherein the combining unit acquires a result obtained by dividing, by speed of sound, a difference between a distance between each of the selected sound acquisition units and the target and a distance set in advance as an ideal distance of a sound acquisition unit with respect to the target, as a delay amount with respect to acoustic signals from the selected sound acquisition unit.

5. The signal processing apparatus according to claim 1, wherein the combining unit combines amplified acoustic signals obtained 1*w* amplifying, in accordance with a distance between the selected sound acquisition unit and the target, the delayed acoustic signals.

6. The signal processing apparatus according to claim 5, wherein the combining unit acquires, as an amplification coefficient, a value of a common logarithm of a result obtained by dividing a distance between each of the selected sound acquisition units and the target by a distance set in advance as an ideal distance of a sound acquisition unit with respect to the target, and combines amplified acoustic signals obtained by amplifying, in accordance with the amplification coefficient, the delayed acoustic signals.

7. The signal processing apparatus according to claim 1, further comprising a unit configured to control an azimuth angle and an elevation angle of each of the sound acquisition units to direct the sound acquisition unit in a direction of the target.

8. A signal processing method comprising:

selecting, as selected sound acquisition units, two or more sound acquisition units from a plurality of sound acquisition units, based upon a position of a target estimated based upon a plurality of captured images including the target;

combining delayed acoustic signals obtained by delaying acoustic signals from each of the selected sound acquisition units, based upon a delay amount based upon a distance between the selected sound acquisition unit and the target; and outputting, as an acoustic signal of the target, a combination result combined in the combining.

9. A non-transitory computer-readable storage medium storing a computer program for causing a computer to function as:

a selection unit configured to select, as selected sound acquisition units, two or more sound acquisition units from a plurality of sound acquisition units, based upon a position of a target estimated based upon a plurality of captured images including the target;

a combining unit configured to combine delayed acoustic signals obtained by delaying acoustic signals from each of the selected sound acquisition units, based upon a delay amount based upon a distance between the selected sound acquisition unit and the target; and an output unit configured to output, as an acoustic signal of the target, a combination result combined by the combination unit.

* * * * *